Feb. 16, 1937.  J. R. GAMMETER  2,071,299
JOINT FOR ROADWAYS
Filed Dec. 22, 1933  2 Sheets-Sheet 1

INVENTOR
John R. Gammeter

Ely & Barrow
ATTORNEYS

Feb. 16, 1937. J. R. GAMMETER 2,071,299
JOINT FOR ROADWAYS
Filed Dec. 22, 1933 2 Sheets-Sheet 2
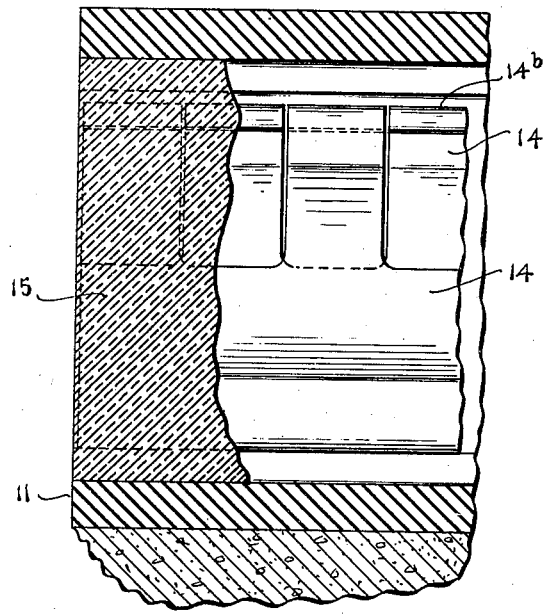
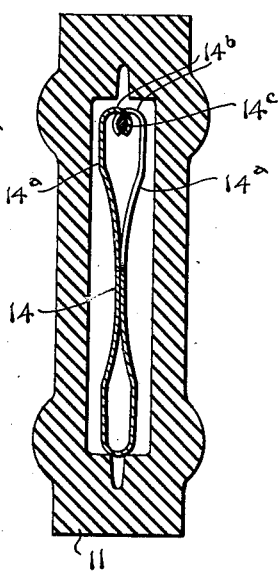
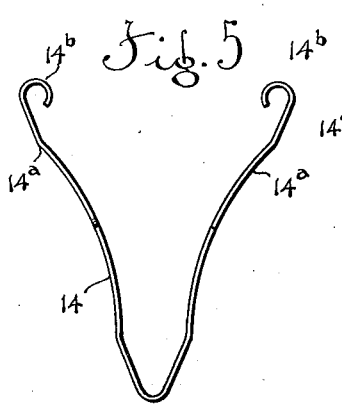
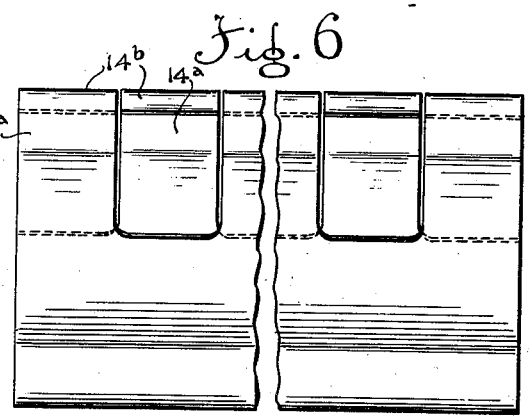
INVENTOR
John R. Gammeter
BY
ATTORNEYS Patented Feb. 16, 1937

2,071,299

UNITED STATES PATENT OFFICE 2,071,299

JOINT FOR ROADWAYS

John R. Gammeter, Akron, Ohio

Application December 22, 1933, Serial No. 703,537

17 Claims. (Cl. 94—18)

This invention relates to yielding joints for roadways such as concrete roadways to allow for expansion and contraction.

The general purpose of the invention is to provide a joint strip for mounting between sections of a roadway which is capable of effective contraction and expansion while maintaining the road surface at the joint and which is substantially unaffected by changes in temperature and other atmospheric conditions.

More particularly the invention has for its object the provision of a joint strip for use in roadways of concrete or the like which comprises a permanently tough, flexible, resilient or elastic material such as vulcanized rubber and effective yielding means associated with said strip for normally expanding the joint strip and maintaining its surfaces against the sections of the roadway at the joint. The yielding means utilized will not take a permanent "set" in the joint and thus will indefinitely maintain an effective joint.

A further purpose of the invention is to provide a hollow strip of elastic sealing material such as rubber having therein a metallic spring means for normally expanding the strip. A further object of the invention is to provide such a joint strip with means for holding the spring means in a contracting condition until after the joint is made in the roadway, said means being releasable after the joint is made so as to release the spring means and allow it to expand the hollow joint strip.

The foregoing and other purposes or objects of the invention are attained in the roadway joint and joint strip shown in the accompanying drawings and described below. It is to be understood that the invention is not limited to the specific form thereof shown and described.

Of the accompanying drawings,

Figure 3 is a fragmentary section along line 3—3 of Figure 1 at an edge of the roadway;

Figure 4 is a transverse section through a joint strip before release of the spring means;

Figure 5 is an end view of the spring means in its fully expanded condition; and Figure 6 is a fragmentary elevation thereof.

Figure 1:
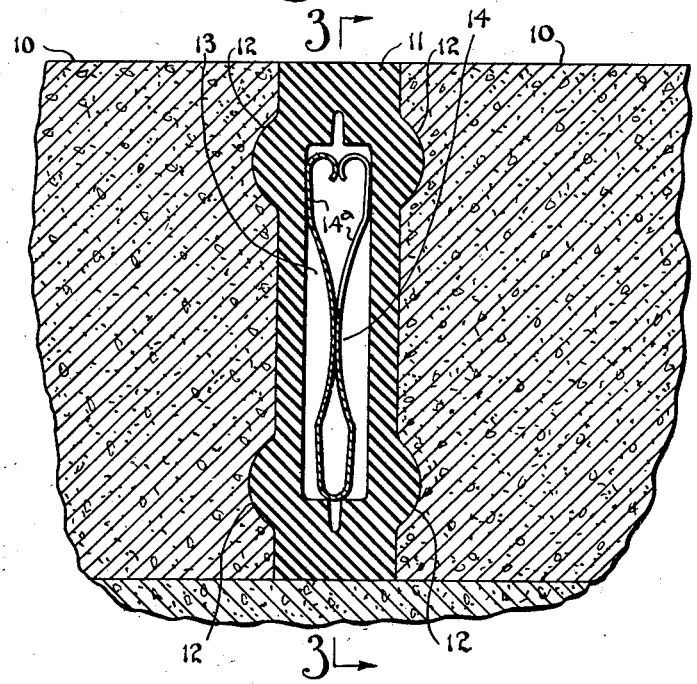
Figure 1 is a fragmentary, longitudinal section through a roadway having the improved joint arranged therein in the preferred manner.

Referring to the drawings, the numerals 10, 10 indicate adjoining sections of a concrete or like roadway between which is arranged a joint strip 11. This joint strip comprises a permanently elastic or resilient, tough material substantially unaffected by temperature changes and by water, preferably a vulcanized rubber. It is preferably formed with projecting ribs 12, 12 on its side faces and it is formed with a longitudinal bore 13.

It has been found that rubber and similar materials take a permanent "set" after a short period of being subjected to contraction and expansion and joint strips made solely of rubber or the like are not entirely satisfactory on this account. In accordance with the present invention, the strip 11 is adapted to be yieldingly expanded by a metallic spring means 14 arranged in the bore 13. This spring means may comprise a strip of spring metal bent longitudinally to substantially open V-shape as shown in Figure 5, the opposite sides of the V being formed with lugs 14ª, 14ª so arranged that when the strip is compressed the lugs 14ª on one side of the V will extend in spaces between the lugs 14ª on the other side of the V, the lugs 14ª having loops 14ᵇ, 14ᵇ thereon whereby a strip of material such as wire 14ᶜ may be run through the loops 14ᵇ of the opposite lugs 14ª when the strip is compressed sufficiently to bring the opposite loops 14ᵇ into alignment with each other, the wire 14ᶜ holding the strip 14 in a compressed condition as shown in Figure 4.

Figure 2:
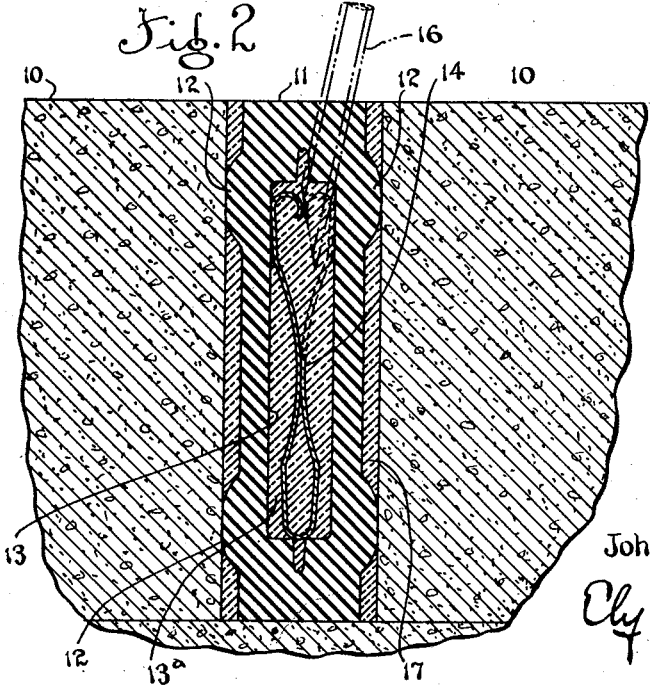
Figure 2 is a similar view showing the joint strip of the invention arranged in the roadway in a somewhat different manner.

To make a joint, a strip 11 and a spring strip 14 of the proper length comparable to the width of the roadway are assembled as shown in Figure 4 and applied in the roadway either in the manner indicated in Figure 1 or in the manner indicated in Figure 2. In Figure 1 the strip 11 with the contained spring means 14 is placed before the road sections 10 are poured, whereby the concrete molds itself about the strip 11 and the ribs 12 thereof interlock with the concrete sections. After the sections 10 are thus molded about the strip 11, the wire 14ᶜ is removed by pulling it out of the end of the strip 11. The bore 13 in the strip 11 may be sealed at the edge of the roadway by filling the open end thereof with suitable material such as asphalt or pitch indicated at 15 in Figure 3, or the entire bore 13 may be filled with asphalt, pitch or the like in which pockets may be left for permitting expansion or contraction, or which asphalt or pitch may be aerated or cellular in nature. The joint strip may be filled with such materials by means of injecting needle 16 as indicated in dotted lines in Figure 2 through which the material may be forced under pressure, the needle 16 being used to pierce the strip 11 at any point along the joint strip.

The joint strip 11 in Figure 2 may be inserted into the joint between sections 10 after these have been molded about a form strip (not shown). The concrete sections are poured in the usual way and after they have set the form strip is removed from the joint and the strip 11 is inserted into the joint. This is preferably done by coating the strip 11 with a suitable lubricating material 17 which may be asphalt and pressing it down into the space between the road sections, compressing ribs 12, 12 as shown. The strip in Figure 2 is shown filled with aerated asphalt or the like at 13a. After the joint strip 11 is thus applied the wire 14c is removed, allowing the spring 14 to expand.

It will be apparent from the foregoing that an effective road joint has been provided. The rubber or like material provides a most effective seal if pressed against the adjacent surfaces of the expanding and contracting sections of the roadway and also makes an effective protecting envelope for the spring means 14 which provides the pressure for maintaining the seal.

Modifications of the invention may be resorted to without departing from the spirit thereof or the scope of the appended claims.

What is claimed is:

1. A joint strip for roadways comprising a hollow strip of tough, elastic, water-proof material, and an expansible, metallic, spring strip arranged therein for yieldingly expanding said hollow strip.

2. A joint strip for roadways comprising a hollow strip of tough, elastic, water-proof material, and an expansible, metallic, spring strip arranged therein for yieldingly expanding said hollow strip, said hollow strip comprising vulcanized rubber.

3. A joint strip for roadways comprising a hollow strip of tough, elastic, water-proof material, an expansible, metallic, spring strip arranged therein for yieldingly expanding said hollow strip, and releasable means for temporarily holding said spring strip contracted in said hollow strip.

4. A joint strip for roadways comprising a hollow strip of tough, elastic, water-proof material, and an expansible, metallic, spring strip arranged therein for yieldingly expanding said hollow strip, said hollow strip surrounding an enclosing said metallic spring strip.

5. A joint strip for roadways comprising a hollow strip of tough, elastic, water-proof material, and an expansible, metallic, spring strip arranged therein for yieldingly expanding said hollow strip, said spring strip being normally of V shape in section and having interposed lugs on opposite sides of the V formed with apertures adapted to be aligned when the spring strip is transversely contracted, and a continuous element passed through said apertures to hold the said spring strip transversely contracted and removable endwise from said spring strip to permit transverse expansion of said spring strip.

6. A joint strip for roadways comprising a hollow strip of tough, elastic, water-proof material, and an expansible, metallic, spring strip arranged therein for yieldingly expanding said hollow strip, said joint strip having projections on the faces thereof for interlocking with the roadway sections.

7. A joint strip for roadways comprising a hollow strip of tough, elastic, water-proof material, and an expansible, metallic, spring strip arranged therein for yieldingly expanding said hollow strip, said hollow strip surrounding and enclosing said metallic spring strip, said joint strip having projections on the face thereof for interlocking with the roadway sections.

8. A joint strip for roadways comprising a hollow strip of tough, elastic, water-proof material, and an expansible, metallic, spring strip arranged therein for yieldingly expanding said hollow strip, said hollow strip surrounding and enclosing said metallic spring strip, said joint strip being filled with a water-proof sealing material.

9. A joint strip for roadways comprising a strip of tough, water-proof elastic, readily compressible and extensible material, and an expansible means associated therewith for yieldably expanding said strip.

10. A joint strip for roadways comprising a strip of expansible and contractible, wear-resisting material, and yieldable means associated with said material for normally maintaining the latter in an expanded condition.

11. In combination with a sectional roadway, a joint strip for insertion between adjacent sections, of expansible and contractible, wear-resisting material, and yieldable means associated with said strip for normally maintaining the latter in expanded condition and in contact with the adjacent sections.

12. In combination with a sectional roadway, a joint strip for insertion between adjacent sections and composed of flexible wear-resisting, readily compressible and extensible material having a longitudinally extending opening therein, and yieldable means disposed in said opening and normally exerting an outward pressure on said strip for maintaining the latter in contact with the adjacent sections.

13. In combination with a sectional roadway, a joint strip for insertion between adjacent sections and composed of flexible wear-resisting, readily compressible and extensible material having a longitudinally extending opening therethrough, yieldable means disposed in said opening and normally exerting an outward pressure on said strip for maintaining the latter in contact with the adjacent sections, and means for sealing said opening.

14. In combination with a sectional roadway, a joint strip for insertion between adjacent sections and composed of flexible wear-resisting, readily compressible and extensible material having a longitudinally extending opening therein, interengaging formations between said strip and the adjacent sections, and yieldable means disposed in said opening and normally exerting an outward pressure on said strip for maintaining the latter in contact with the adjacent sections.

15. A joint strip for roadways comprising a strip of wear-resisting material having an opening therein, a pressure exerting means in said opening initially maintained in inoperative position, and means by which said pressure exerting means may be rendered operative at will.

16. In combination with a sectional roadway, a joint strip of expansible and contractible material for insertion between adjacent sections and means associated with said strip for positively maintaining contact between said strip and the adjacent sections during expansion and contraction of said sections due to temperature changes.

17. A joint strip for roadways comprising a preformed vulcanized rubber strip having a longitudinally extending opening therein, and a spring metal member in said opening adapted to exert an outward pressure on said strip.

JOHN R. GAMMETER.